US009940828B2

(12) United States Patent
Hou et al.

(10) Patent No.: US 9,940,828 B2
(45) Date of Patent: Apr. 10, 2018

(54) HOME APPLIANCE CONTROL METHOD AND DEVICE

(71) Applicant: Xiaomi Inc., Beijing (CN)

(72) Inventors: Enxing Hou, Beijing (CN); Deguo Meng, Beijing (CN); Lijun Hei, Beijing (CN)

(73) Assignee: XIAOMI INC., Haidian District, Beijing (CN)

( * ) Notice: Subject to any disclaimer, the term of this patent is extended or adjusted under 35 U.S.C. 154(b) by 0 days.

(21) Appl. No.: 15/226,923

(22) Filed: Aug. 3, 2016

(65) Prior Publication Data

US 2017/0046947 A1 Feb. 16, 2017

(30) Foreign Application Priority Data

Aug. 13, 2015 (CN) .......................... 2015 1 0498532

(51) Int. Cl.
*G05B 11/01* (2006.01)
*G08C 17/02* (2006.01)

(52) U.S. Cl.
CPC .................................... *G08C 17/02* (2013.01)

(58) Field of Classification Search
CPC .... G08C 17/00; G08C 17/02; G08C 2201/00; G08C 2201/50; G08C 2201/51; G08C 2201/91; G08C 2201/93
USPC ............................................. 340/12.5, 12.51
See application file for complete search history.

(56) References Cited

U.S. PATENT DOCUMENTS

| | | | | |
|---|---|---|---|---|
| 8,239,073 | B2 * | 8/2012 | Fausak | G01D 4/002 700/276 |
| 8,560,012 | B2 * | 10/2013 | Ohnishi | G08C 17/00 340/10.42 |
| 9,111,440 | B2 * | 8/2015 | Park | G08C 17/02 |
| 9,189,751 | B2 * | 11/2015 | Matsuoka | H04L 12/2829 |
| 2005/0007987 | A1 * | 1/2005 | Yagi | H04B 7/2615 370/347 |
| 2005/0094610 | A1 | 5/2005 | de Clerq et al. | |

(Continued)

FOREIGN PATENT DOCUMENTS

| | | | |
|---|---|---|---|
| CN | 103823393 | A | 5/2014 |
| CN | 103926890 | A | 7/2014 |

(Continued)

OTHER PUBLICATIONS

The International Search Report for PCT/CN2015/097716.

(Continued)

*Primary Examiner* — Carlos E Garcia
(74) *Attorney, Agent, or Firm* — Jun He Law Offices P.C.; James J. Zhu

(57) ABSTRACT

A home appliance control method and device are provided. The method includes: receiving operation mode information from a home appliance, wherein the operation mode information indicates a current operation mode of the home appliance; and sending the operation mode information to another home appliance to cause said another home appliance to operate in the indicated operation mode. Accordingly, a wearable device can receive from a home appliance operation mode information, and then send the same to another home appliance to cause said another home appliance to operate in the operation mode of the home appliance.

22 Claims, 13 Drawing Sheets

(56) References Cited

U.S. PATENT DOCUMENTS

| | | | | |
|---|---|---|---|---|
| 2011/0057518 | A1* | 3/2011 | Gilbert | G06F 1/266 307/112 |
| 2011/0196547 | A1* | 8/2011 | Park | G06Q 50/06 700/296 |
| 2011/0264286 | A1* | 10/2011 | Park | G06Q 10/00 700/286 |
| 2011/0309933 | A1 | 12/2011 | Marino | |
| 2011/0314483 | A1* | 12/2011 | Juan | G11B 7/08511 720/672 |
| 2012/0200400 | A1* | 8/2012 | Arling | G08C 19/28 340/12.28 |
| 2013/0094444 | A1* | 4/2013 | Lai | H04W 8/265 370/328 |
| 2013/0110302 | A1* | 5/2013 | Ferlitsch | H04L 12/2823 700/295 |
| 2013/0247117 | A1* | 9/2013 | Yamada | G08C 17/02 725/93 |
| 2014/0028441 | A1* | 1/2014 | Amran | G05B 19/409 340/5.67 |
| 2014/0129006 | A1* | 5/2014 | Chen | G05B 15/02 700/90 |
| 2014/0371942 | A1* | 12/2014 | Matsuyama | H02J 3/14 700/297 |
| 2015/0042240 | A1* | 2/2015 | Aggarwal | H04L 12/2803 315/292 |
| 2015/0106061 | A1* | 4/2015 | Yang | G08C 17/00 702/188 |
| 2015/0236908 | A1* | 8/2015 | Kim | H04L 67/32 709/221 |
| 2015/0268648 | A1* | 9/2015 | Zhang | G05B 15/02 700/90 |
| 2016/0036958 | A1* | 2/2016 | Logan | G05B 19/042 455/414.1 |
| 2016/0157090 | A1* | 6/2016 | Huang | H04L 12/4625 370/329 |
| 2016/0191267 | A1* | 6/2016 | Zhang | H04W 4/001 709/219 |
| 2016/0231724 | A1* | 8/2016 | Bauer | G05B 19/0428 |
| 2016/0249286 | A1* | 8/2016 | Chen | H04W 48/20 |
| 2016/0299675 | A1* | 10/2016 | Winde | G08C 17/02 |
| 2016/0330191 | A1* | 11/2016 | Watanabe | H04L 63/083 |
| 2016/0357163 | A1* | 12/2016 | Marti | G05B 15/02 |
| 2016/0359325 | A1* | 12/2016 | Kawata | H02J 3/14 |
| 2017/0188238 | A1* | 6/2017 | Nagamatsu | H04W 12/08 |

FOREIGN PATENT DOCUMENTS

| | | | |
|---|---|---|---|
| CN | 104197470 | A | 12/2014 |
| CN | 104460593 | A | 3/2015 |
| CN | 104483953 | A | 4/2015 |
| CN | 104633860 | A | 5/2015 |
| CN | 104656593 | A | 5/2015 |
| CN | 104748303 | A | 7/2015 |
| CN | 104748315 | A | 7/2015 |
| CN | 104776547 | A | 7/2015 |
| CN | 105137787 | A | 12/2015 |
| EP | 1892597 | A1 | 2/2008 |
| GB | 2465629 | A | 6/2010 |
| RU | 130098 | A | 7/2013 |
| WO | 2005015519 | A1 | 2/2005 |

OTHER PUBLICATIONS

Office Action issued in corresponding Chinese Application No. 2016118867 dated Jul. 20, 2017.

The Extended European Search Report of EP 16161699.

* cited by examiner

HOME APPLIANCE CONTROL METHOD AND DEVICE

CROSS-REFERENCE TO RELATED APPLICATIONS

This application claims priority of Chinese Patent Application No. 201510498532.7, filed on Aug. 13, 2015, which is incorporated herein by reference in its entirety.

TECHNICAL FIELD

The present disclosure generally relates to appliance control, and more particularly, to a method and device for controlling a home appliance.

BACKGROUND

With the continuous development of electronic technology, there are an increasing number of and a greater variety of home appliances for daily use in houses. Sometimes, a house has multiple rooms furnished with the same kind of home appliances (e.g. air-conditioners, air purifiers, air moisteners, etc.). In such a case, for the same kind of appliances to operate in the same mode, a user needs to adjust operation modes of these home appliances one by one. This process is troublesome because operating modes of modern home appliances involves an increasing number of parameters.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The present disclosure solves the above problems by providing home appliance control methods and devices, and a storage medium.

According to a first aspect of the present disclosure, there is provided a home appliance control method. The method is implemented by a wearable device, and includes: receiving operation mode information from a home appliance, wherein the operation mode information indicates a current operation mode of the home appliance; and sending the operation mode information to another home appliance to cause said another home appliance to operate in the indicated operation mode.

According to a second aspect of the present disclosure, there is provided a home appliance control method. The method is implemented by a home appliance, and includes: sending operation mode information to a wearable device, wherein the operation mode information indicates a current operation mode of the home appliance, and the operation mode information is sent by the wearable device to another home appliance to cause said another home appliance to operate in the operation mode.

According to a third aspect of the present disclosure, there is provided a wearable device. The device includes: a processor; and a memory storing instructions executable by the processor; wherein the processor is configured to: receive operation mode information from a home appliance, wherein the operation mode information indicates a current operation mode of the home appliance; and send the operation mode information to another home appliance to cause said another home appliance to operate in the indicated operation mode.

According to a fourth aspect of the present disclosure, there is provided a home appliance. The appliance includes: a processor; and a memory containing instructions executable by the processor; wherein the processor is configured to: receive operation mode information from a wearable device, wherein the operation mode information indicates an operation mode; and operate in the operation mode.

The technical solutions provided by the embodiments of the present disclosure may have the following advantageous effects:

By implementing the home appliance methods and devices described in the present disclosure, a wearable device may be configured to receive from a home appliance operation mode information and then send the same to another home appliance to cause said another home appliance to operate in the operation mode. This enables multiple home appliances in a user's house to operate in the same operation mode without having to adjust operation modes of the home appliances one by one, thereby simplifying the user's operations.

It is to be understood that both the foregoing general description and the following detailed description are exemplary and explanatory only and are not restrictive of the disclosure.

BRIEF DESCRIPTION OF THE DRAWINGS

The accompanying drawings herein, which are incorporated in and constitute a part of this specification, illustrate embodiments consistent with the disclosure. These accompanying drawings, together with the specification, serve to explain the principles of the disclosure.

DETAILED DESCRIPTION

Reference will now be made in detail to certain embodiments, examples of which are illustrated in the accompanying drawings. The following description refers to the accompanying drawings in which the same numbers in different figures represent the same or similar elements unless otherwise indicated. The implementations set forth in the following description of embodiments do not represent all implementations consistent with the disclosure. Instead, they are merely examples of devices and methods consistent with aspects related to the disclosure as recited in the appended claims.

Figure 1:
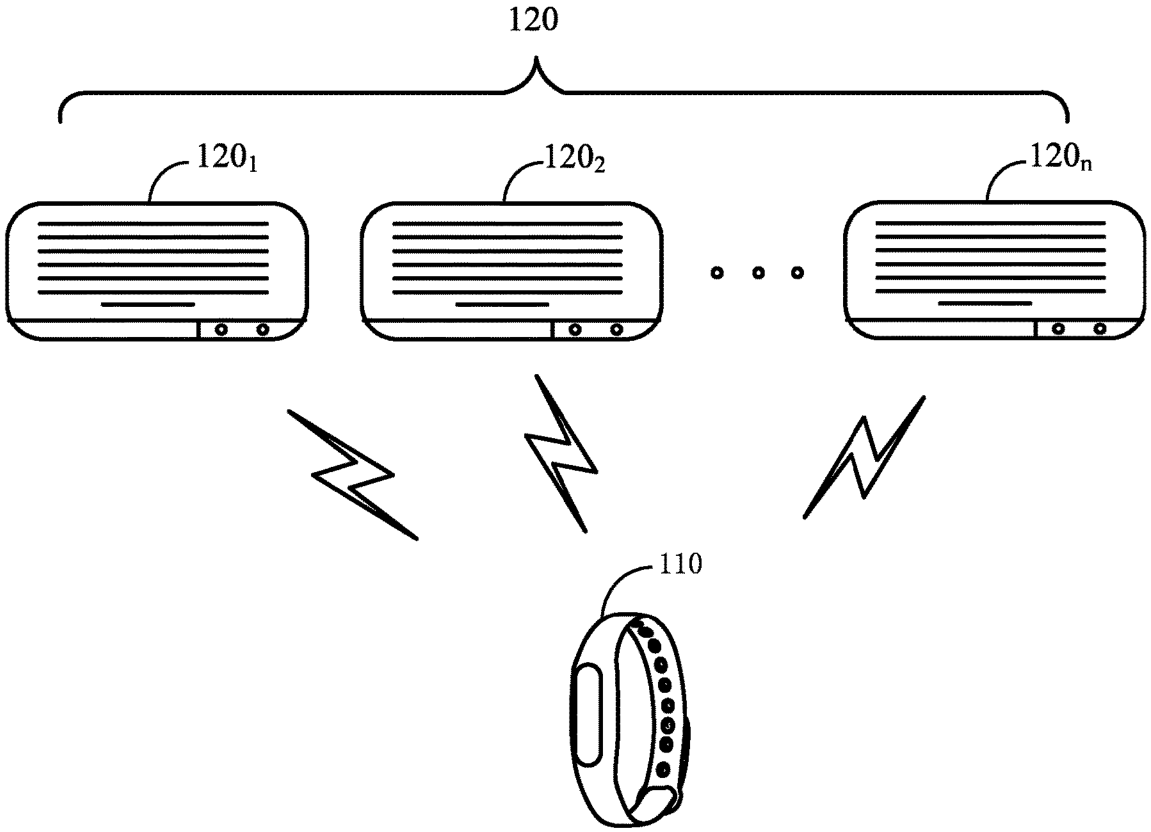
FIG. 1 is a schematic diagram illustrating an implementation environment according to an exemplary embodiment.

FIG. 1 is a schematic diagram illustrating an implementation environment according to an exemplary embodiment. Referring to FIG. 1, the implementation environment may include a wearable device 110 and a plurality of home appliances $120_1$-$120_n$, wherein the wearable device 110 may communicate with the plurality of home appliances $120_1$-$120_n$ through Bluetooth, WiFi, 2G, 3G or other wired or wireless communication technologies.

The wearable device 110 may be, for example, a smart bracelet, a smart watch, a smart ring or smart clothes. In FIG. 1, the wearable device 110 is shown as a smart bracelet.

The home appliances $120_1$-$120_n$ can communicate with the wearable device 110, and may be, for example, air-conditioners, air purifiers or air moisteners. In FIG. 1, the home appliances $120_1$-$120_n$ are shown as air-conditioners.

Figure 2:
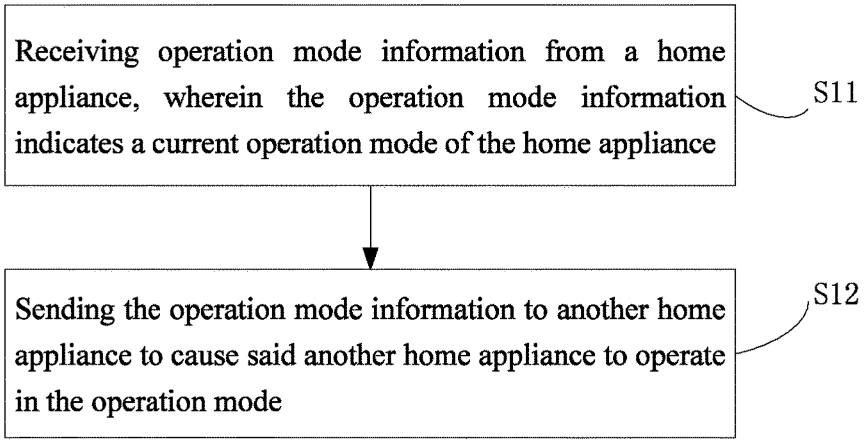
FIG. 2 is a flow chart illustrating a method for controlling a home appliance according to an exemplary embodiment.

FIG. 2 is a flow chart illustrating a method for controlling a home appliance according to an exemplary embodiment. The method is implemented by a wearable device 110. As shown in FIG. 2, the method includes the following steps:

In step S11, operation mode information is received from a home appliance $120_m$ ($m \in [1,n]$, and m is a positive integer), wherein the operation mode information indicates a current operation mode of the home appliance $120_m$.

The operation mode may include parameters needed for the operation of home appliances $120_1$-$120_n$, such as temperature, wind volume, timer, quiet mode and power level. The operation mode may be adjusted and controlled using control panels on the home appliances $120_1$-$120_n$, or using remote controllers or other controlling means.

The operation mode information may be sent and received at various timings. For example, a wearable device 110 may send a request to a home appliance $120_m$ and receive a response regarding the operation mode information. Alternatively, the home appliance $120_m$ may initiatively send the operation mode information after its operation mode changed, while the wearable device 110 may be configured to receive the operation mode information, either at a certain interval or continuously. Specifically, the wearable device 110 may be configured with a "receive" button and a "send" button. When the "receive" button is pressed, the wearable device 110 may receive from the home appliance $120_m$ the operation mode information. The specific manners for sending and receiving the information may be implemented using any means commonly known in the art, and will not be elaborated herein.

In step S12, the operation mode information is sent to another home appliance $120_p$ ($p \in [1,n]$, and p is a positive integer) for it to operate accordingly.

The wearable device 110 may be bound to a plurality of home appliances **$120_1$-120*n* in advance. After the wearable device 110 sends operation mode information to another home appliance $120_p$, home appliance $120_p$** can operate in the operation mode defined by the operation mode information.

Figure 3:
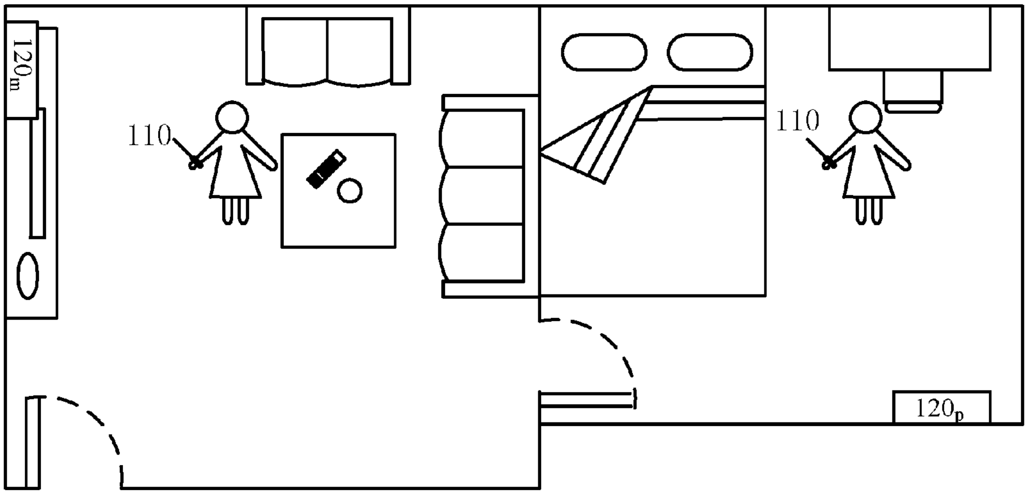
FIG. 3 is a diagram of a scenario illustrating a method for controlling a home appliance according to an exemplary embodiment.

FIG. 3 is a diagram of a scenario illustrating a method for controlling a home appliance according to an exemplary embodiment. In FIG. 3, a user wears a smart bracelet 110 in a house, when an air-conditioner $120_m$ in the living room of the house and an air-conditioner $120_p$ in the bedroom of the house are working. With a remote controller, the user adjusts the air-conditioner $120_m$ in living room by changing its temperature from 25° C. to 26° C. and its wind volume from Medium to Low. Then, the user presses a "receive" button on the smart bracelet 110, and the air-conditioner $120_m$ in living room will send operation mode information indicating 26° C. and Low wind volume through Bluetooth to the smart bracelet 110 worn by the user. After walking into the bedroom, the user presses a "send" button on the smart bracelet 110, which sends the operation mode information to the air-conditioner $120_p$ in the bedroom. Upon receiving the operation mode information, the bedroom air-conditioner $120_p$ will accordingly set its temperature to 26° C. and its wind volume to Low.

In this manner, multiple home appliances $120_1$-$120_n$ in a user's house can operate in the same operation mode without having to adjust operation modes of the home appliances one by one, thereby simplifying the user's operations.

Some home appliances $120_1$-$120_n$ (e.g. an air-conditioner) may require a user to be within a certain range to serve effectively to the user. Accordingly, these home appliances may be configured to start or stop operation based on the distance between a wearable device 110 carried by the user and the home appliances $120_1$-$120_n$. The distance may be determined by signal strength of communications between the wearable device on the user and the home appliances $120_1$-$120_n$.

Figure 4:
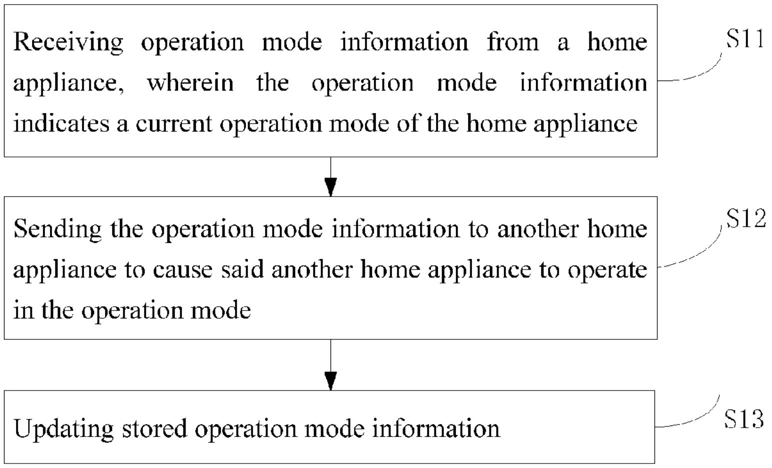
FIG. 4 is a flow chart illustrating a method for controlling a home appliance according to another exemplary embodiment.

FIG. 4 is a flow chart illustrating a method for controlling a home appliance according to another exemplary embodiment. The method is implemented by a wearable device 110. As illustrated in FIG. 4, the method may, in addition to what is illustrated in FIG. 2, include the following steps.

In step S13, operation mode information stored in the wearable device 110 is updated with the operation mode information received from the home appliance 120.

The wearable device 110 only stores one or more pieces of operation mode information most recently received. When receiving a new piece of operation mode information, the wearable device 110 may automatically delete the oldest piece of operation mode information it has stored to save memory space.

Figure 5:
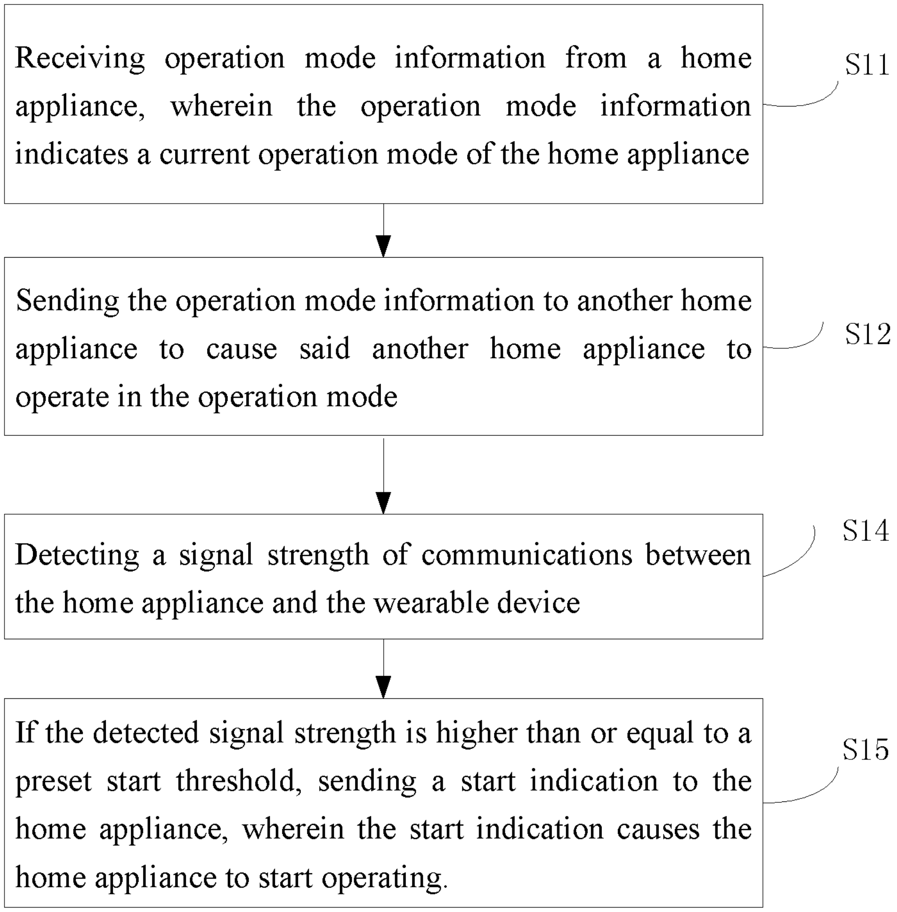
FIG. 5 is a flow chart illustrating a method for controlling a home appliance according to yet another exemplary embodiment.

FIG. 5 is a flow chart illustrated a method for controlling a home appliance 120 according to yet another exemplary embodiment. The method is implemented by a wearable device 110. As illustrated in FIG. 5, the method may, in addition to what is illustrated in FIG. 2, include the following steps:

In step S14, a signal strength of communications between the home appliance 120 and the wearable device 110 is detected.

The wearable device 110 can detect the signal strength of communications between the home appliance 120 and the wearable device 110 in various manners known by a person skilled in the art. For example, the signal strength may be determined by the time required for receiving a response from the wearable device 110 after information is sent to it. The longer it takes to receive the response from the wearable device 110, the weaker the signal strength is, or vice versa.

In step S15, if the detected signal strength is higher than or equal to a predetermined threshold strength, a start indication is sent to the home appliance 120, wherein the start indication causes the home appliance 120 to start operating.

Here, signal strength above or on a predetermined threshold strength is considered to indicate that the distance between the user (who wears the wearable device 110) and the home appliance 120 is short enough for the home appliance 120 to effectively serve the user. Then, the wearable device 110 carried by the user may send a start indication to the home appliance 120. The home appliance 120 will in turn start operating according to the received start indication.

The signal strength may be determined by the time required for receiving a response from the home appliance 120 after information is sent to the home appliance 110. The longer it takes to receive the response from the home appliance 120, the weaker the signal strength is, or vice versa.

Here, the threshold strength may be configured according to the specific function of the home appliance 120. For example, when the home appliance 120 is an air-conditioner, the threshold strength may be set at signal strength achievable when the user is in the room where the home appliance 120 is located.

In this embodiment, the home appliance 120 may be configured to start operating when the signal strength of the communications between the wearable device 110 and the home appliance 120 reaches a certain level. Accordingly, a home appliance 120 may start automatically based on the position of the user, thereby eliminating the trouble of manual operation.

Figure 6:
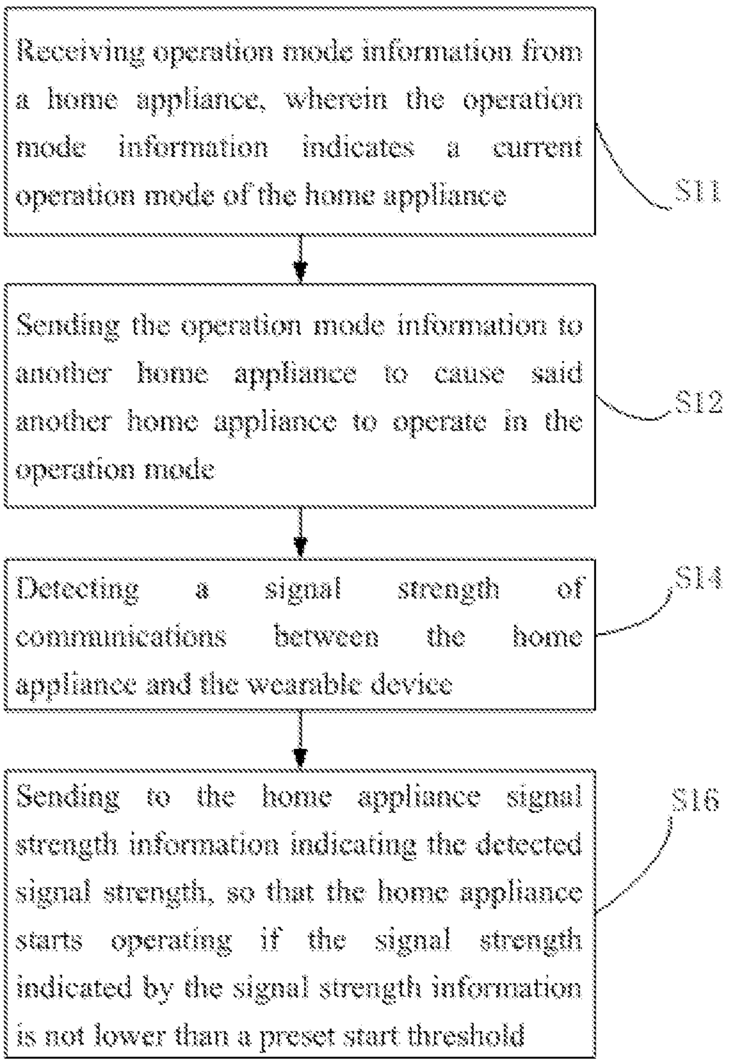
FIG. 6 is a flow chart illustrating a method for controlling a home appliance according to yet another exemplary embodiment.

Also, a home appliance 120 may be configured to receive the signal strength information detected by a wearable device 110 and determine whether to start operating. FIG. 6 is a flow chart illustrating a method for controlling a home appliance according to yet another exemplary embodiment. The method is implemented by a wearable device 110. As illustrated in FIG. 6, the method may, in addition to what is illustrated in FIG. 2, include the following steps:

In step S14, signal strength of communications between the home appliance 120 and the wearable device 110 is detected.

In step S16, signal strength information indicating the detected signal strength is sent to the home appliance 120, in order to cause the home appliance 120 to start operating if the detected signal strength indicated by the signal strength information is higher than or equal to a preset threshold strength.

The embodiment illustrated in FIG. 6 differs from the embodiment in FIG. 5. In FIG. 6, the wearable device 110 sends the signal strength information, and the home appliance 120 is configured to determine whether a user is within an acceptable range based on the received signal strength information (i.e. whether the signal strength is above or on a preset threshold strength). The home appliance 120 will start operation if the signal strength is above or on the preset threshold strength.

In certain embodiments, the wearable device 110 may pre-establish binding relationships with multiple different types of home appliances. The wearable device 110 can receive operation mode information sent by the first type of home appliances, the current operation mode of which is included in the above-mentioned operation mode information. The wearable device 110 can send the above-mentioned operation mode information to the same type of home appliances as the first type of home appliances, so the same type of home appliances can operate in the above-mentioned operation mode. The wearable device 110 can also send the above-mentioned operation mode information to the second type of home appliances that is different from the first type of home appliances, in order to cause them to operate in the above-mentioned operation mode.

For example, the wearable device 110 may establish relationships with air-conditioning A, humidifier B and air purifier C. As certain embodiments, the wearable device 110 may receive operation mode information including a current operation mode of a home appliance $120_m$ from air-conditioning A.

Here, the operation mode may include the relevant parameters of the air-conditioning operation, such as temperature, wind volume, preset time, silent mode and power level. The operation mode may be adjusted and controlled using control panels on the home appliances $120_1$-$120_n$, or using remote controllers or other controlling means. The operation mode information may be sent and received at various timings. The specific manners for sending and receiving the information may be implemented using any means commonly known in the art, and will not be elaborated herein.

The wearable device 110 may send the operation mode information to the humidifier. As certain embodiments, the wearable device 110 may send the operation mode information according to the sending appliances. For example, if the sending appliance is the humidifier, the wearable device 110 may send operation mode information including preset time, humidity, or silent mode to the humidifier, in order to cause it to operate in the operation mode. If the sending appliance is the air purifier, the wearable device 110 may send operation mode information including preset time or silent mode to the air purifier, in order to cause it to operate in the operation mode.

In some embodiments, the wearable device 110 can broadcast operation mode information to the entire network. The network is the one connecting home appliances, such as the LAN, Internet of Things, or the World Wide Web. After receiving the operation mode information, home appliances may determine whether the operation mode information match or not, if they match, then the home appliances would operate in the operation mode. If not, then no operation would occur.

Figure 7:
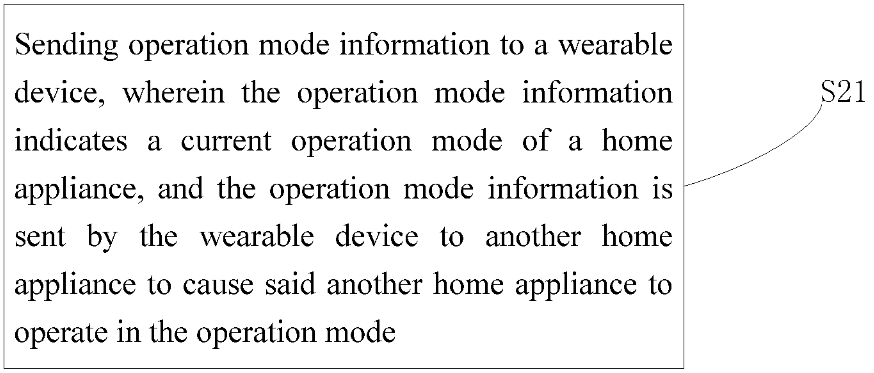
FIG. 7 is a flow chart illustrating a method for controlling a home appliance according to an exemplary embodiment.

In addition to the method for controlling a wearable device 110 described above, the present disclosure provides a method for controlling a home appliance. FIG. 7 is a flow chart illustrating a method for controlling a home appliance according to an exemplary embodiment. As illustrated in FIG. 7, the method is implemented by a home appliance 120, and includes the following steps:

In step S21, operation mode information, including a current operation mode of a home appliance $\mathbf{120}_m$, is sent to a wearable device 110. Then the operation mode information is sent by the wearable device 110 to another home appliance $\mathbf{120}_p$ to cause the home appliance $\mathbf{120}_p$ to operate in the operation mode.

The above step S21 corresponds to step S11. Similar to step S11, the home appliance $\mathbf{120}_m$ may initiatively send the operation mode information after its operation mode is adjusted, while the wearable device 110 may be configured to receive the operation mode information, either at a certain interval or continuously.

In the embodiment illustrated in FIG. 7, the home appliance $\mathbf{120}_m$ may be configured to send the wearable device 110 the operation mode information but not to receive from the wearable device 110 any operation mode information. Accordingly, the home appliance $\mathbf{120}_m$ may serve as a control center controlling other home appliances. The operation mode of the home appliance $\mathbf{120}_m$ will not be influenced by any change in operation modes of the other home appliances. Furthermore, the other home appliances may receive, through the wearable device 110, operation mode of the home appliance $\mathbf{120}_m$, and start operation in the same mode.

In this manner, multiple home appliances $\mathbf{120}_1$-$\mathbf{120}_n$ in a user's house can operate in the same operation mode without adjusting operation modes of the home appliances one by one, thereby simplifying the user's operations.

Figure 8:
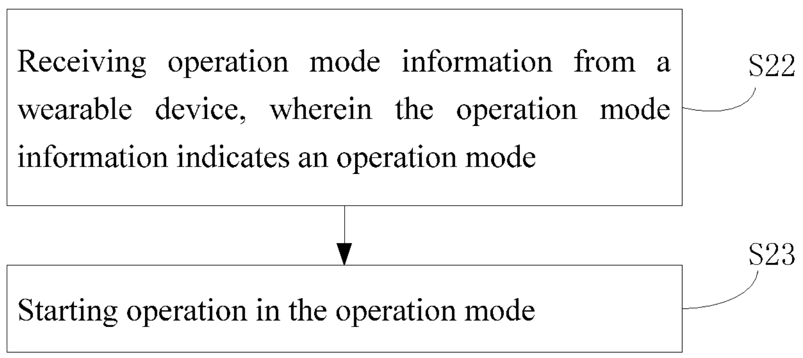
FIG. 8 is a flow chart illustrating a method for controlling a home appliance according to another exemplary embodiment.

Correspondingly, some home appliances 120 may be configured to receive from the wearable device 110 operation mode information but send out none. FIG. 8 is a flow chart illustrating a method for controlling a home appliance 120 according to another exemplary embodiment. As illustrated in FIG. 8, the method includes the following steps.

In step S22, operation mode information is received from a wearable device 110, wherein the operation mode information indicates an operation mode.

In step S23, the home appliance operates in the operation mode.

The above steps S22 and S23 correspond to step S12. As described above, after receiving the operation mode information, the home appliance $\mathbf{120}_p$ controls itself to operate in the operation mode indicated by the operation mode information.

Understandably, the home appliance 120 may be configured to not only send out operation mode information but also receive such information from a wearable device 110 and operates in the operation mode indicated by the received operation mode information (if its original operation mode is different from the indicated operation mode). In this manner, the home appliance 120 may be configured as both a sender and a receiver of operation mode information, thereby improving flexibility and diversifying the approaches for adjusting the operation mode.

Figure 9:
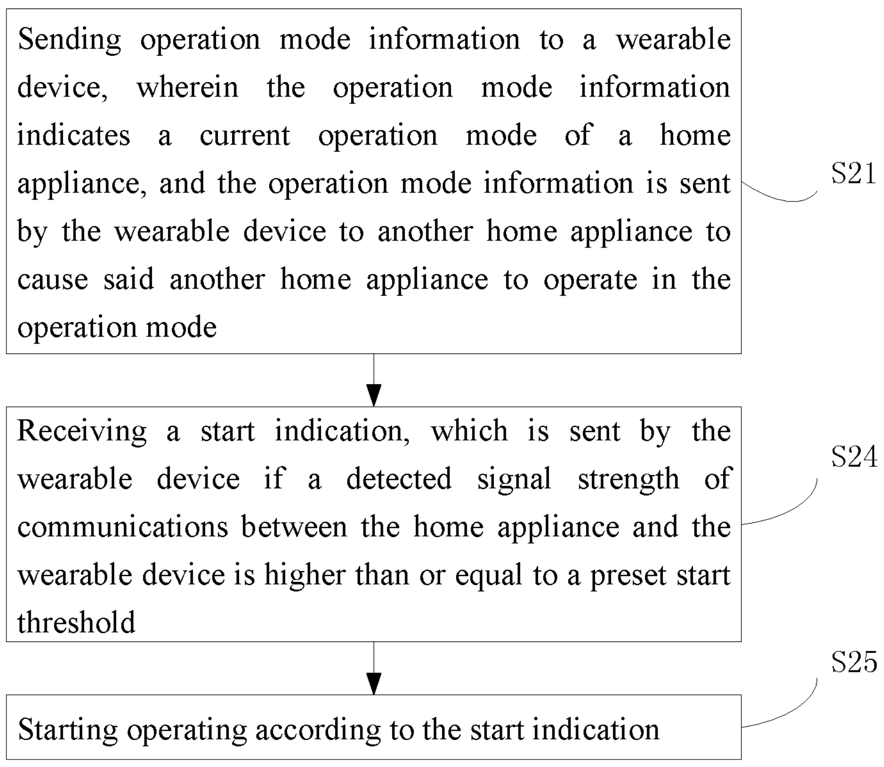
FIG. 9 is a flow chart illustrating a method for controlling a home appliance according to yet another exemplary embodiment.

Moreover, correspondingly to the step S15 described above, the present disclosure provides another method for controlling a home appliance 120. FIG. 9 is a flow chart illustrating a method for controlling a home appliance 120 according to yet another exemplary embodiment. As illustrated in FIG. 9, the method may, in addition to what is illustrated in FIG. 7, include the following steps:

In step S24, a start indication sent by the wearable device 110 is received if the signal strength of communications between the home appliance 120 and the wearable device 110 is higher than or equal to a preset threshold strength.

In step S25, the home appliance starts operating according to the start indication.

The above steps S24 and S25 correspond to step S15, and are performed on a home appliance 120. As described above, signal strength above or on a preset threshold strength is considered to indicate that the distance between the user and the home appliance 120 is short enough for the home appliance 120 to effectively serve the user. After receiving the start indication, the home appliance 120 converts its original state (e.g. standby) to start operating according to the start indication.

In the embodiment illustrated in FIG. 9, the home appliance 120 may be configured to start operating when the signal strength of communications between the wearable device 110 and the home appliance 120 reaches a certain level. Accordingly, a home appliance 120 may start automatically based on the position of the user, thereby eliminating the trouble of manual operation.

Figure 10:
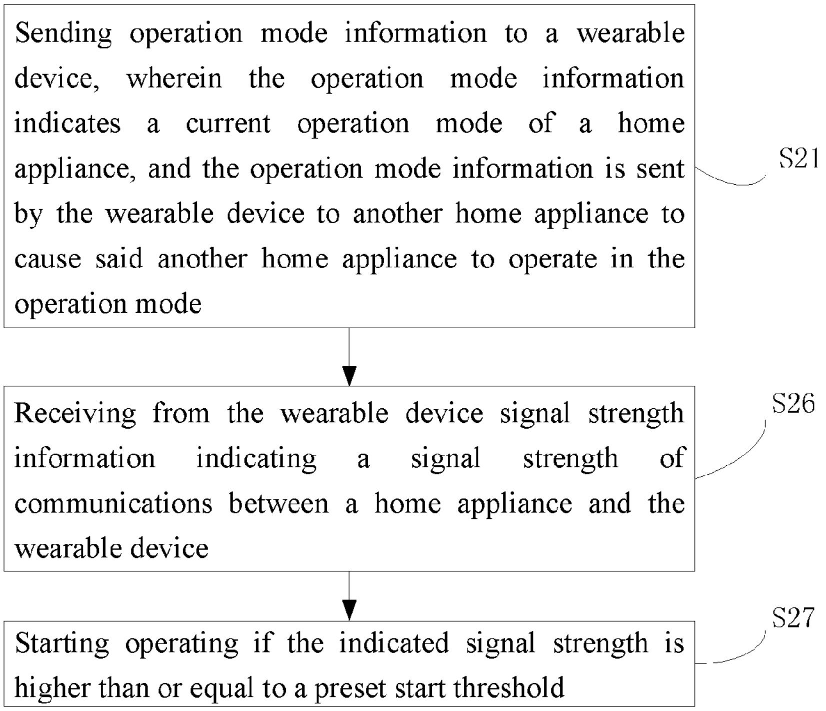
FIG. 10 is a flow chart illustrating a method for controlling a home appliance according to yet another exemplary embodiment.

In the above embodiment, the wearable device 110 is configured to detect the signal strength and to send the start indication to the home appliance 120. Alternatively, the home appliance 120 may be configured to detect the signal strength, thereby enabling the appliance to control its start and stop. FIG. 10 is a flow chart illustrating a method for controlling a home appliance 120 according to yet another exemplary embodiment. The method is implemented by a home appliance 120. As illustrated in FIG. 10, the method may, in addition to what is illustrated in FIG. 6, include the following steps:

In step S26, signal strength information indicating signal strength of communications between the home appliance 120 and the wearable device 110 is received from the wearable device 110.

In step S27, the home appliance starts operating if the detected signal strength is higher than or equal to a preset threshold strength.

The above steps S26 and S27 correspond to step S17. The embodiment illustrated in FIG. 9 differs from the embodiment in FIG. 10. In FIG. 9, the home appliance 120 receives signal strength information, compares the signal strength against an internally stored threshold strength, and determines whether to start operating according to the comparison. The embodiment illustrated in FIG. 10 has the advantages of saving memory space and reducing computational burden on the wearable device 110.

Figure 11:
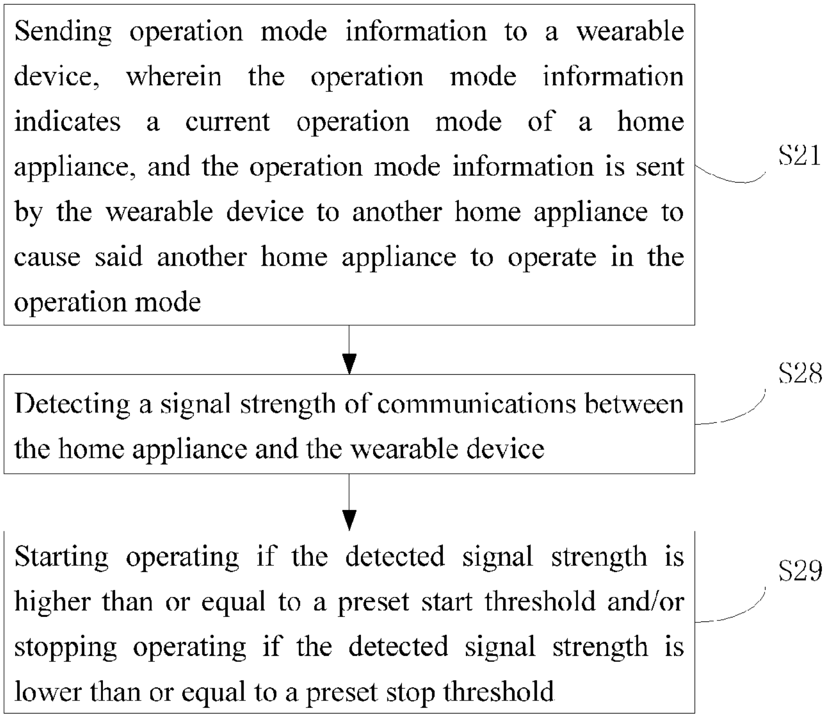
FIG. 11 is a flow chart illustrating a method for controlling a home appliance according to yet another exemplary embodiment.

Besides, the home appliance 120 itself may detect the signal strength. FIG. 11 is a flow chart illustrated a method for controlling a home appliance 120 according to yet another exemplary embodiment. As illustrated in FIG. 11, the method may, in addition to what is illustrated in FIG. 6, include the following steps:

In step S28, signal strength of communications between the home appliance 120 and the wearable device 110 is detected.

In step S29, the home appliance 120 starts operating if the detected signal strength is higher than or equal to a preset threshold strength and/or stops operating if the detected signal strength is lower than or equal to a preset stop threshold.

Similar to step S14, the signal strength may be detected by using various means known by a person skilled in the art. Here, the threshold strength may be configured according to the specific function of the home appliance 120. For example, when the home appliance 120 is an air-conditioner, the threshold strength may be set at a signal strength achievable when the user is in the room where the home appliance 120 is located.

For example, as the user wearing a smart bracelet 110 leaves a room for another, the Bluetooth signal strength emitted by an air-conditioner 120 in the former room will be diminishing. When the signal strength reaches a certain threshold, the air-conditioner 120 stops operating automatically. Meanwhile, the Bluetooth signal strength radiating from an air-conditioner 120 in the latter room will be increasing. When the signal strength reaches a certain threshold, the second air-conditioner 120 starts operating automatically.

In this way, the home appliance 120 may control its start/stop according to this self-generated signal strength between itself and the wearable device 110, thereby enabling the home appliance 120 to automatically start or stop operating according to the user's demands. Accordingly, the trouble of manual operation is eliminated and the on/off of the home appliance 120 can be controlled in a smart manner.

Instead of determining whether the relative position between the home appliance 120 and the wearable device 110 based on the signal strength therebetween, other detecting devices may also be used to detect the position of the user so as to control the on/off of the home appliance 120 according to the detected position of the user.

Figure 12:
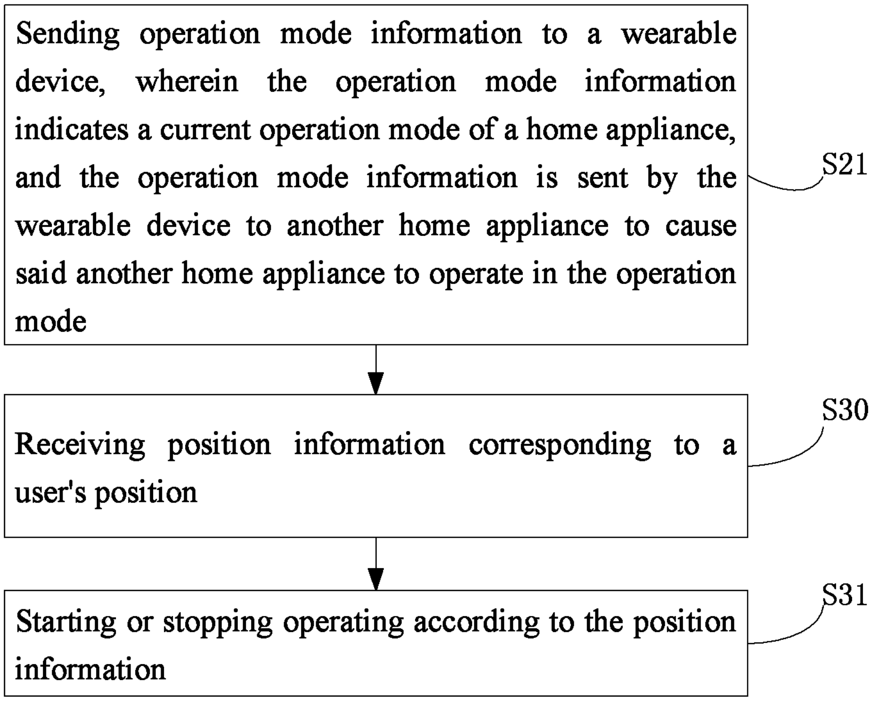
FIG. 12 is a flow chart illustrating a method for controlling a home appliance according to another exemplary embodiment.

FIG. 12 is a flow chart illustrating a method for controlling a home appliance according to yet another exemplary embodiment. The method is implemented by a home appliance 120. As illustrated in FIG. 12, the method may, in addition to what is illustrated in FIG. 6, include the following steps:

In step S30, position information corresponding to a user's position is received.

The position information may be given out by a detecting device connected with the home appliance 120, wherein the detecting device may be an infra-red (IR) sensor, a camera, or any other device capable of detecting the position of a user. The position information may include such position and/or a result of whether this position is within a preset range.

For example, an IR sensor or a camera may be arranged in the room where the home appliance 120 is located in order to detect the position of a user in this room. As the IR sensor or camera senses the presence of a person, the position of that person is sent to the home appliance 120. Upon receiving the position information, the home appliance 120 will either start or stop operation according to that position information.

In step S31, the home appliance starts or stops operating according to the position information.

Figure 13:
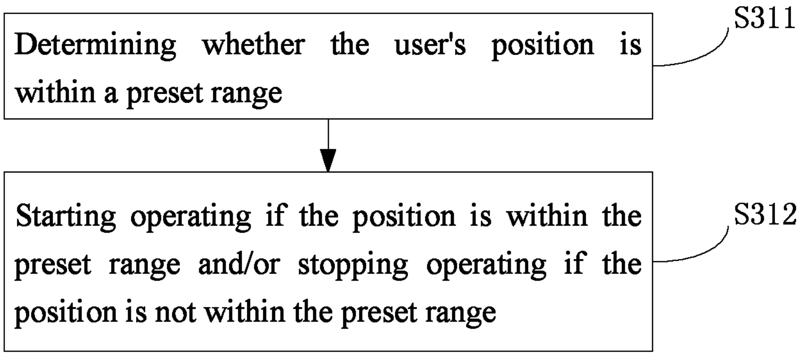
FIG. 13 is a flow chart illustrating starting or stopping operation based on position information according to an exemplary embodiment.

In particular, FIG. 13 is a flow chart illustrating starting or stopping operation in response to position information according to an exemplary embodiment. When the position information includes a position of a user, as illustrated in FIG. 13, the step S31 may include the following steps:

In step S311, the home appliance determines whether the user's position is within a preset range.

In step S312, the home appliance starts operating if the position is within the preset range and/or stops operating if the position is not within the preset range.

The preset range may be such that the operation of a home appliance $120_1$-$120_n$ can have a certain effect on a user within the range. For instance, if the home appliance 120 is an air-conditioner, the preset range may be the room where the air-conditioner is located.

According to the embodiment of FIG. 13, a home appliance 120 can control its on/off based on the detected position of the user. Accordingly, the trouble of manual operation is eliminated and the on/off of the home appliance 120 can be controlled in a smart manner.

Figure 14:
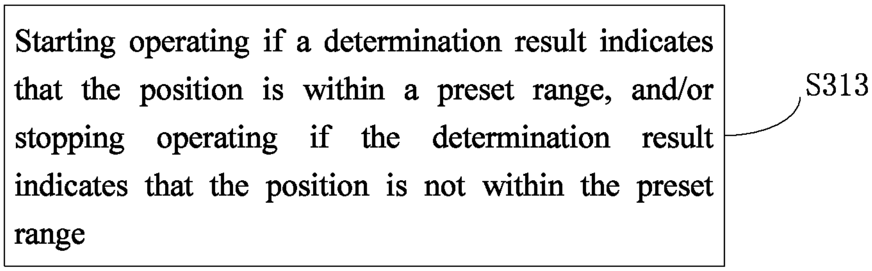
FIG. 14 is a flow chart illustrating starting or stopping operation based on position information according to another exemplary embodiment.
Figure 15:
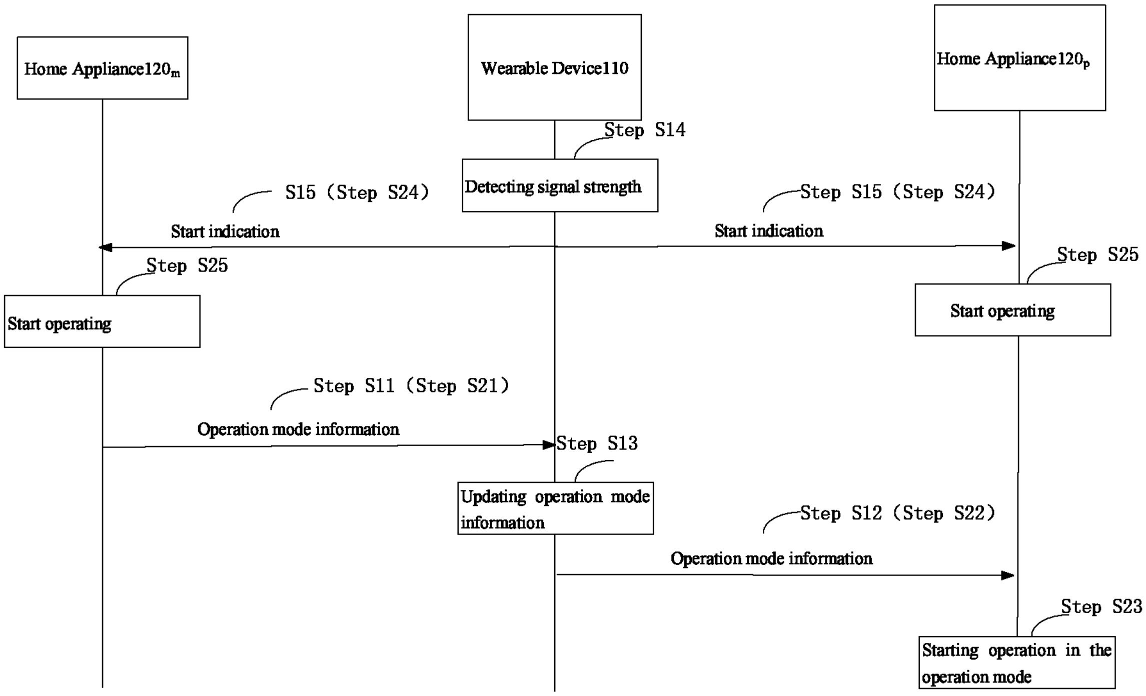
FIGS. 15-18 are signaling diagrams each illustrating signaling exchanged between a home appliance and a wearable device for controlling the home appliance according to an exemplary embodiment.
Figure 16:
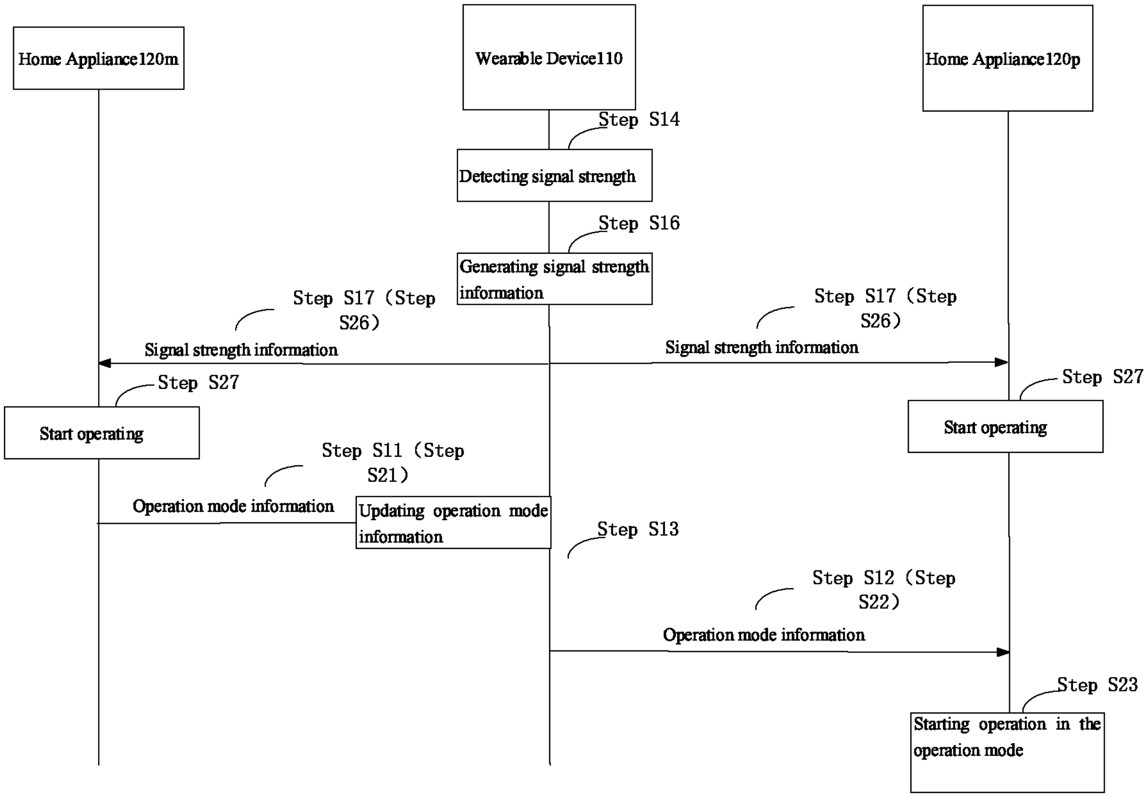
Figure 17:
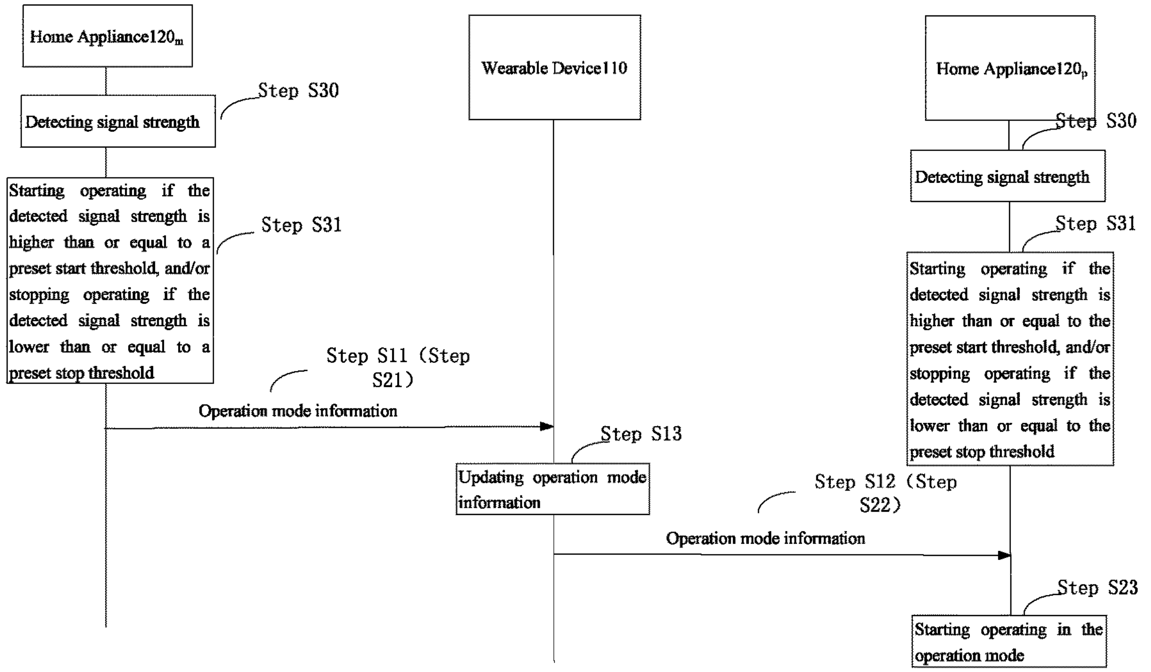
Figure 18:
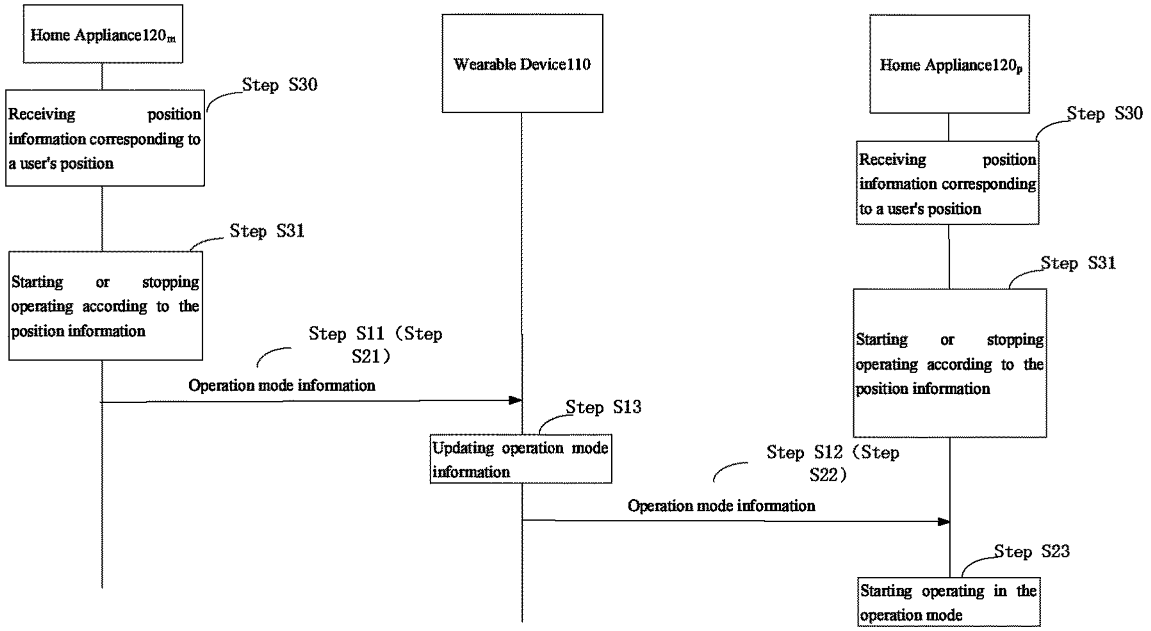

FIG. 14 is a flow chart illustrating starting or stopping operation based on position information according to another exemplary embodiment. When the position information includes a result of whether the user's position is within a preset range, as illustrated in FIG. 14, the step S31 may include the following steps:

In step S313, the home appliance starts operating if the determined result indicates that the position is within the preset range and/or stops operating if the determined result indicates that the position is not within the preset range.

The embodiment illustrated in FIG. 14 differs from the embodiment in FIG. 13. In FIG. 14, after detecting the position of a user, the detecting device determines whether the position is within a pre-defined range and sends the determined result to the home appliance 120, so that the home appliance 120 simply accepts a determined result instead of performing the step of determining.

According to the above embodiment, a home appliance 120 can control its on/off based on the detected position of the user. Accordingly, the trouble of manual operation is eliminated and the on/off of the home appliance 120 can be controlled in a smart manner.

FIGS. 15-18 are signaling diagrams each illustrating signaling exchanged between a home appliance 120 and a wearable device 110 for controlling the home appliance according to an exemplary embodiment. The steps have been detailed before and will not be elaborated herein.

Figure 19:
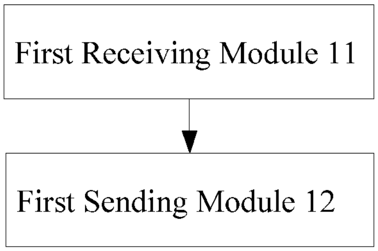
FIG. 19 is a block diagram illustrating a device for controlling a home appliance according to an exemplary embodiment.

The present disclosure also provides a device for controlling a home appliance that may be configured for a wearable device 110. FIG. 19 is a block diagram illustrating a device for controlling a home appliance according to an exemplary embodiment. Referring to FIG. 19, the device may include a first receiving module 11 and a first sending module 12.

The first receiving module 11 is configured to receive operation mode information from a home appliance $\mathbf{120}_m$, wherein the operation mode information indicates a current operation mode of the home appliance $\mathbf{120}_m$.

The first sending module 12 is configured to send the operation mode information to another home appliance $\mathbf{120}_p$ to cause the home appliance $\mathbf{120}_p$ to operate in the operation mode.

Figure 20:
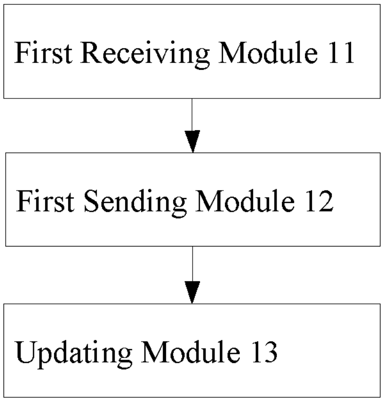
FIG. 20 is a block diagram illustrating a device for controlling a home appliance according to another exemplary embodiment.

FIG. 20 is a block diagram illustrating a device for controlling a home appliance according to another exemplary embodiment. The device may be implemented by a wearable device 110. As illustrated in FIG. 20, the device may include, in addition to what is illustrated in FIG. 19, an updating module 13.

The updating module 13 is configured to update operation mode information stored in the wearable device 110 with the operation mode information received from the home appliance 120.

Figure 21:
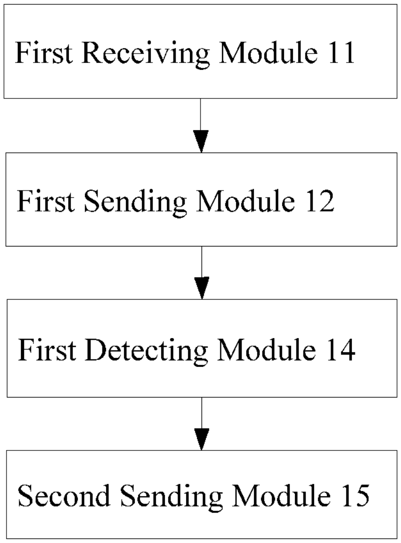
FIG. 21 is a block diagram illustrating a device for controlling a home appliance according to yet another exemplary embodiment.

FIG. 21 is a block diagram illustrating a device for controlling a home appliance according to another exemplary embodiment. The device may be implemented by a wearable device 110. As illustrated in FIG. 21, the device may include, in addition to what is illustrated in FIG. 19, a first detecting module 14 and a second sending module 15.

The first detecting module 14 is configured to detect a signal strength of communications between the home appliance 120 and the wearable device 110.

The second sending module 15 is configured to, if the detected signal strength is higher than or equal to a preset threshold strength, send a start indication to the home appliance 120, wherein the start indication causes the home appliance 120 to start operating.

Figure 22:
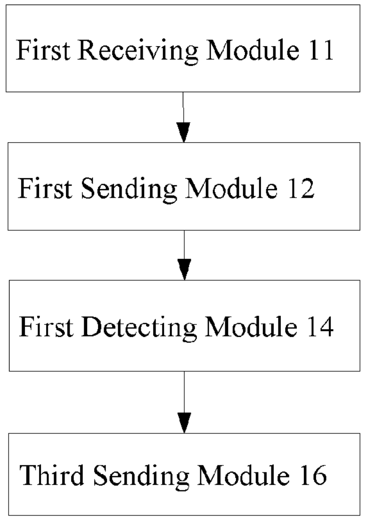
FIG. 22 is a block diagram illustrating a device for controlling a home appliance according to yet another exemplary embodiment.

FIG. 22 is a block diagram illustrating a device for controlling a home appliance according to another exemplary embodiment. The device may be implemented by a wearable device 110. As illustrated in FIG. 22, the device may include, in addition to what is illustrated in FIG. 19, a first detecting module 14 and a third sending module 16.

The first detecting module 14 is configured to detect a signal strength of communications between the home appliance 120 and the wearable device 110.

The third sending module 16 is configured to send to the home appliance 120 signal strength information indicating the detected signal strength to cause the home appliance 120 to start operating if the detected signal strength indicated by the signal strength information is higher than or equal to a preset threshold strength.

Figure 23:
FIG. 23 is a block diagram illustrating a device for controlling a home appliance according to an exemplary embodiment.

The present disclosure also provides a device for controlling a home appliance that may be configured for a home appliance 120. FIG. 23 is a block diagram illustrating a device for controlling a home appliance according to an exemplary embodiment. Referring to FIG. 23, the device may include a fourth sending module 21.

The fourth sending module 21 is configured to send operation mode information to a wearable device 110, wherein the operation mode information indicates a current operation mode of the home appliance 120. Then, the operation mode information is sent by the wearable device 110 to another home appliance $\mathbf{120}_p$ to cause the home appliance $\mathbf{120}_p$ to operate in the operation mode.

Figure 24:
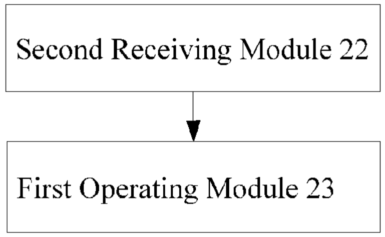
FIG. 24 is a block diagram illustrating a device for controlling a home appliance according to another exemplary embodiment.

FIG. 24 is a block diagram illustrating a device for controlling a home appliance according to another exemplary embodiment. The device may be configured for a home appliance 120. Referring to FIG. 24, the device may include a second receiving module 22 and a first starting module 23.

The second receiving module 22 is configured to receive operation mode information from a wearable device 110, wherein the operation mode information indicates an operation mode.

The first starting module 23 is configured to cause the home appliance to start operating in the operation mode.

Figure 25:
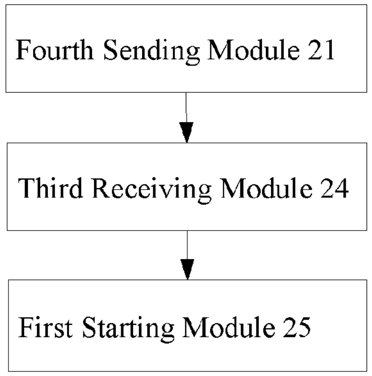
FIG. 25 is a block diagram illustrating a device for controlling a home appliance according to yet another exemplary embodiment.

FIG. 25 is a block diagram illustrating a device for controlling a home appliance according to another exemplary embodiment. The device may be configured for a home appliance 120. As illustrated in FIG. 25, the device may include, in addition to what is illustrated in FIG. 22, a third receiving module 24 and a first starting module 25.

The third receiving module 24 is configured to receive a start indication, which is sent by a wearable device 110 if detected signal strength of communications between a home appliance 120 and the wearable device 110 is higher than or equal to a preset threshold strength.

The first starting module 25 is configured to cause the home appliance to start operating according to the start indication.

Figure 26:
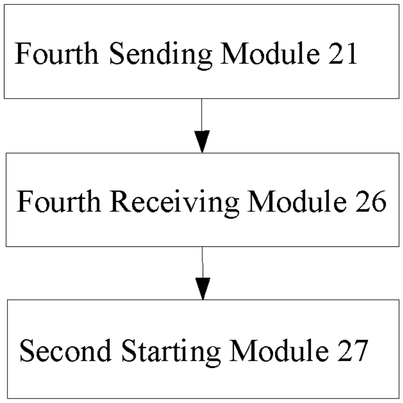
FIG. 26 is a block diagram illustrating a device for controlling a home appliance according to yet another exemplary embodiment.

FIG. 26 is a block diagram illustrating a device for controlling a home appliance according to another exemplary embodiment. The device may be configured for a home appliance 120. As illustrated in FIG. 26, the device may include, in addition to what is illustrated in FIG. 22, a fourth receiving module 26 and a second starting module 27.

The fourth receiving module 26 is configured to receive from the wearable device 110 signal strength information indicating signal strength of communications between the home appliance 120 and the wearable device 110.

The second starting module 27 is configured to cause the home appliance to start operating if the indicated signal strength is higher than or equal to a preset threshold strength.

Figure 27:
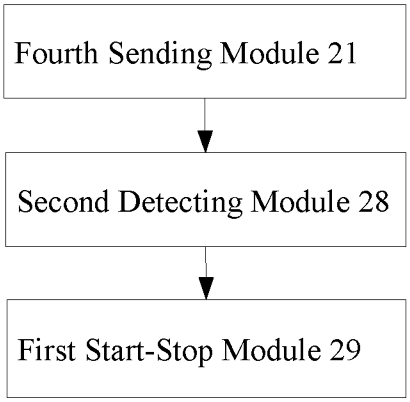
FIG. 27 is a block diagram illustrating a device for controlling a home appliance according to yet another exemplary embodiment.

FIG. 27 is a block diagram illustrating a device for controlling a home appliance according to another exemplary embodiment. The device may be configured for a home appliance 120. As illustrated in FIG. 27, the device may include, in addition to what is illustrated in FIG. 22, a second detecting module 28 and a first start-stop module 29.

The second detecting module 28 is configured to detect a signal strength of communications between the home appliance 120 and the wearable device 110.

The first start-stop module 29 is configured to cause the home appliance to start operating if the detected signal strength is higher than or equal to a preset threshold strength and/or to stop operating if the detected signal strength is lower than or equal to a preset stop threshold.

Figure 28:
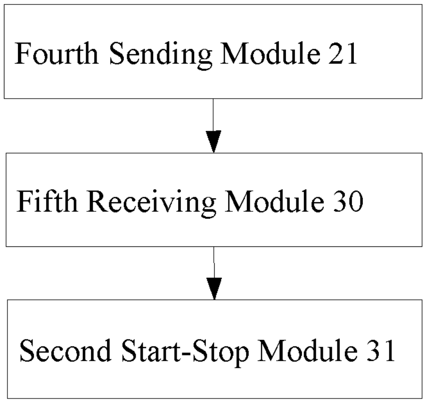
FIG. 28 is a block diagram illustrating a device for controlling a home appliance according to yet another exemplary embodiment.

FIG. 28 is a block diagram illustrating a device for controlling a home appliance according to another exemplary embodiment. The device may be configured for a home appliance 120. As illustrated in FIG. 28, the device may include, in addition to what is illustrated in FIG. 22, a fifth receiving module 30 and a second start-stop module 31.

The fifth receiving module 30 is configured to receive position information corresponding to a user's position.

The second start-stop module 31 is configured to cause the home appliance to start or stop operating according to the position information.

Figure 29:
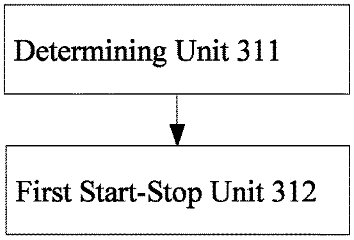
FIG. 29 is a block diagram illustrating a second start-stop module according to an exemplary embodiment.

FIG. 29 is a block diagram illustrating a second start-stop module 31 according to an exemplary embodiment. In the embodiment shown in FIG. 29, the position information includes a position of a user, and the second start-stop module 31 includes a determining unit 311 and a first start-stop unit 312.

The determining unit 311 is configured to determine whether the user's position is within a preset range.

The first start-stop unit 312 is configured to cause the home appliance to start operating if the user's position is within the preset range and/or stop operating if the position is not within the preset range.

Figure 30:
FIG. 30 is a block diagram illustrating a second start-stop module according to another exemplary embodiment.

FIG. 30 is a block diagram illustrating a second start-stop module 31 according to another exemplary embodiment. In the embodiment shown in FIG. 30, the position information includes a result of whether a user's position is within a preset range, and the second start-stop module 31 includes a second start-stop unit 313.

The second start-stop unit 313 is configured to cause the home appliance to start operating if the determined result indicates that the position is within a preset range and/or stop operating if the determined result indicates that the position is not within the preset range.

Detailed operations performed by modules of the devices in the above embodiments have been described in the embodiments of related methods, and will not be elaborated herein.

By implementing the device for controlling a home appliance described in the present disclosure, a wearable device 110 may be configured to receive from a home appliance operation mode information, and then send the same information to another home appliance to cause the another home appliance to operate in the operation mode. This enables multiple home appliances in a user's house to operate in the same operation mode without having to adjust operation modes of the home appliances one by one, thereby simplifying the user's operations.

Figure 31:
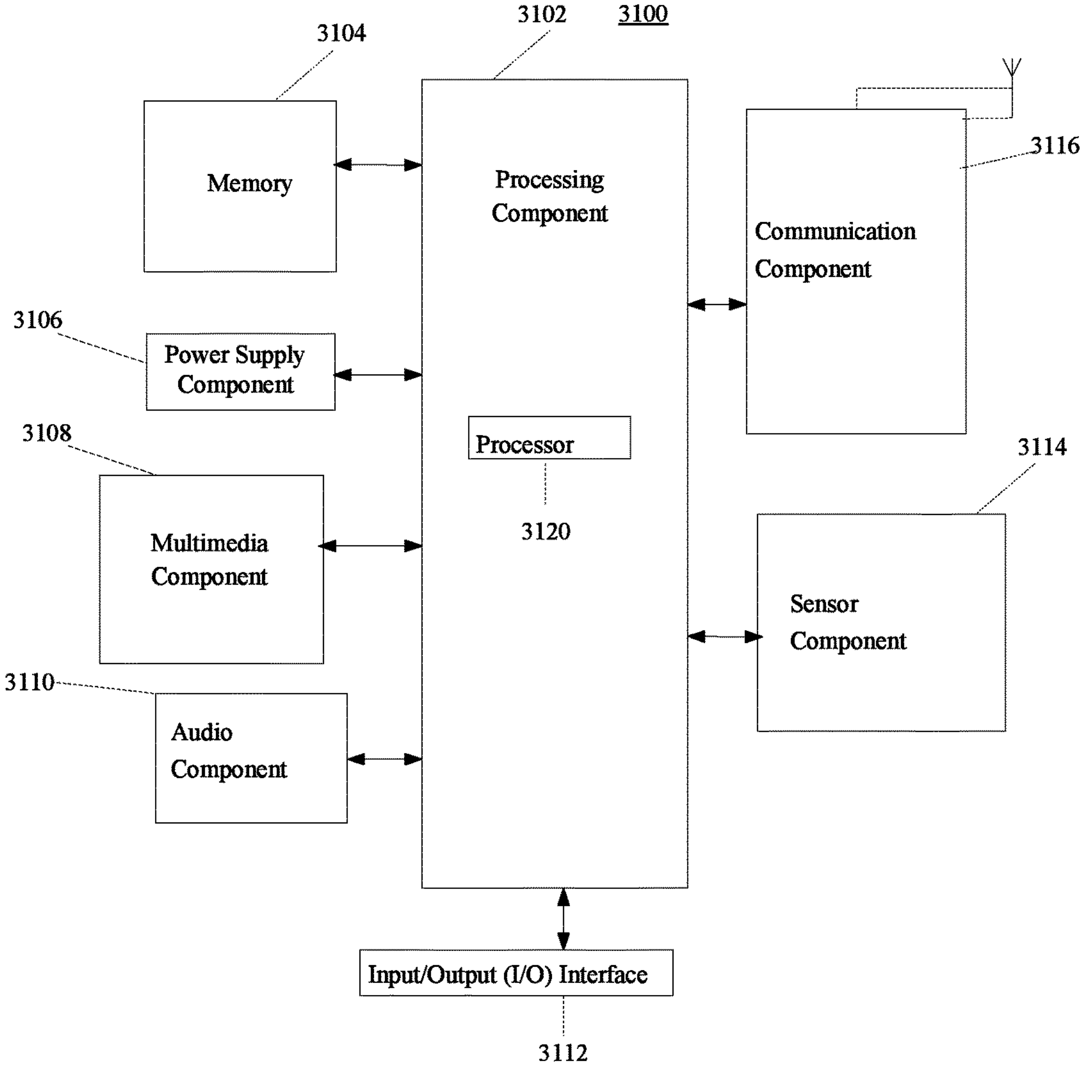
FIG. 31 is a block diagram illustrating a device for controlling a home appliance according to an exemplary embodiment.

FIG. 31 is a block diagram showing a device 3100 for controlling a home appliance according to an exemplary embodiment. The device may be configured for a wearable device 110 or a home appliance 120. For example, the device 3100 may be a smart bracelet, a smart bracelet, smart watch, smart ring, a smart cloth piece, an air-conditioner, an air purifier or an air moistener.

Referring to FIG. 31, the device 3100 may include one or more of the following assemblies: a processing component 3102, a memory 3104, a power supply component 3106, a multimedia component 3108, an audio component 3110, an input/output (I/O) interface 3112, a sensor component 3114 and a communication component 3116.

The processing component 3102 generally controls the overall operations of the device 3100, for example, display, phone call, data communication, camera operation and record operation. The processing component 3102 may include one or more processors 3120 to implement an instruction to complete all or part of stages of the above methods for controlling a home appliance. In addition, the processing component 3102 may include one or more modules to facilitate the interaction between the processing component 3102 and other assemblies. For example, the processing component 3102 may include a multimedia module to facilitate the interaction between the processing component 3108 and the processing component 3102.

The memory 3104 is configured to store various types of data to support the operation performed on the device 3100. The examples of such data include an instruction of any application program or method, contact data, address book data, massages, pictures, videos, etc. which are operated on the device 3100. The memory 3104 may be realized with any kind of a volatile and non-volatile storage device or combination thereof, for example, Static Random Access Memory (SRAM), Electrically-Erasable Programmable Read Only Memory (EEPROM), Erasable Programmable Read Only Memory (EPROM), Programmable Read Only Memory (PROM), Read Only Memory (ROM), a magnetic memory, a flash memory, a magnetic disk or an optical disk.

The power supply component 3106 provides power for various assemblies of the device 3100. The power supply component 3106 may include a power supply management system, one or more power supplies, and other assemblies for generating, managing and distributing power to the device 3100.

The multimedia component 3108 includes a screen providing an output interface between the device 3100 and the user. In some embodiments, the screen may include a Liquid Crystal Display (LCD) and a Touch Panel (TP). If the screen includes the touch panel, the screen may be realized as a touch screen to receive an input information from the user. The touch panel includes one or more touch sensors to sense the touching, sliding and the gestures on the touch panel. The touch sensor may not only sense the touching or border of sliding gesture but only detect the duration time and pressure related to touching or sliding operation. In some embodiments, the multimedia component 3108 includes one front-facing camera and/or one rear-facing camera. When the device 3100 is in an operation mode, for example, a shooting mode or a video mode, the front-facing camera and/or the rear-facing camera may receive outside multimedia data. Each one of front-facing camera and rear-facing camera may be one fixed optical lens system or have focal length or optical zoom ability.

The audio component 3110 is configured to output and/or input audio information. For example, the audio component 3110 includes one microphone (MIC). When the device 3100 is in the operation mode, for example, a calling mode, a record mode and a speech recognition mode, the microphone is configured to receive outside audio information. The received audio information may be further stored in the memory 3104 or sent via the communication component 3116. In some embodiments, the audio component 3110 includes may include a speaker configured to output audio information.

An I/O interface 3112 provides an interface between the processing component 3102 and a peripheral interface module. The above peripheral interface module may be a keyboard, a click wheel, and button, etc. The button may include but not limit to home page button, volume button, start button and lock button.

The sensor component 3114 includes one or more sensors and is configured to provide various aspects of the assessment state for the device 3100. For example, the sensor component 3114 may detect the on/off state of the device 3100, the relative positioning of the assemblies (for example, the assemblies are display and a keypad of the device 3100), position change of the device 3100 or one component of the device 3100, presence or absence of the touch between the user and the device 3100, as well as the orientation or acceleration/deceleration and temperature change of the device 3100. The sensor component 3114 may include a proximity sensor configured to detect the presence of an adjacent object when there is not any physical contact. The sensor component 3114 may also include an optical sensor (such as CMOS or a CCD image sensor) configured to be used in imaging application. In some embodiments, the sensor component 3114 may also include an acceleration sensor, a gyro sensor, a magnetic sensor, a pressure sensor or a temperature sensor.

The communication component 3116 is configured to facilitate the wired or wireless communication between the device 3100 and other apparatuses. The device 3100 may access the wireless network based on a communication standard, such as WiFi, 2G or 3G, or a combination thereof. In one exemplary embodiment, the communication component 3116 receives a broadcast information or broadcast associated information from an external broadcast management system via a broadcast channel. In one exemplary embodiment, the communication component 3116 also includes a Near Field Communication (NFC) module to facilitate short-range communication. For example, the NFC module may be based on Radio Frequency Identification (RFID) technology, Infrared Data Association (IrDA) technology, Ultra-Wideband (UWB) technology, Bluetooth (BT) technology and other technologies.

In an exemplary embodiment, the device 3100 may be realized through one or more Application Specific Integrated Circuits (ASIC), a Digital Signal Processor (DSP), a Digital Signal Processing Device (DSPD), a Programmable Logic Device (PLD), a Field Programmable Gate Array (FPGA), a controller, a microcontroller, a microprocessor, or other electronic elements, and configured to carry out the aforementioned method for controlling a home appliance.

In an exemplary embodiment, a non-transitory computer-readable storage medium comprising the instruction is also provided, for example, the memory 3104 including the instruction. The above instruction may be carried out by the processor 3120 of the device 3100 to complete the above method for controlling a home appliance. For example, the non-transitory computer-readable storage medium may be a ROM, a random access memory (RAM), a CD-ROM, a magnetic tape, a floppy disk, an optical data storage devices and the like.

Those skilled in the art may easily conceive other embodiments of the disclosure from consideration of the specification and practice of the present disclosure. This application is intended to cover any variations, uses, or adaptations of the invention following the general principles thereof and including such departures from the present disclosure as come within known or customary practice in the art. The specification and examples are intended to be exemplary only, with a true scope and spirit of the invention being indicated by the following claims.

It will be appreciated that the present disclosure is not limited to the exact construction that has been described above and illustrated in the accompanying drawings, and that various modifications and changes can be made without departing from the scope thereof. It is intended that the scope of the invention only be limited by the appended claims.

What is claimed:

1. A home appliance control method implemented by a wearable device, comprising:

receiving operation mode information from a home appliance and position information corresponding to a user's position, wherein the operation mode information indicates a current operation mode of the home appliance and comprises various functional parameters needed for the home appliance to operate, and the position information indicates a relative distance between the user and another home appliance; and sending the operation mode information to said another home appliance such that said another home appliance operates in the indicated operation mode when the relative distance between the user and said another home appliance is within a predetermined range, wherein said another home appliance and said home appliance have the same type of functionality.

2. The method according to claim 1, further comprising:

updating operation mode information stored in the wearable device with the operation mode information received from the home appliance.

3. The method according to claim 1, further comprising:

detecting a signal strength of communications between the home appliance and the wearable device; and if the detected signal strength is higher than or equal to a predetermined threshold strength, sending a start indication to the home appliance, the start indication causing the home appliance to start operating.

4. The method according to claim 1, further comprising:

detecting a signal strength of communications between the home appliance and the wearable device; and sending to the home appliance signal strength information indicating the detected signal strength, so that the home appliance starts operating if the signal strength indicated by the signal strength information is higher than or equal to a predetermined threshold strength.

5. A control method implemented by a home appliance, comprising:

receiving operation mode information from a wearable device and position information corresponding to a user's position, wherein the operation mode information indicates an operation mode of another home appliance and comprises various functional parameters needed for said another home appliance to operate, and the position information indicates a relative distance between the user and the home appliance; and operating in the operation mode when the relative distance between the user and the home appliance is within a predetermined range, wherein said another home appliance and said home appliance have the same type of functionality.

6. The method according to claim 5, further comprising:

receiving a start indication, which is sent by the wearable device if a detected signal strength of communications between the home appliance and the wearable device is higher than or equal to a predetermined threshold strength; and starting operating according to the start indication.

7. The method according to claim 5, further comprising:

receiving from the wearable device signal strength information indicating a signal strength of communications between the home appliance and the wearable device; and starting operating if the signal strength indicated by the signal strength information is higher than or equal to a predetermined threshold strength.

8. The method according to claim 5, further comprising:

detecting a signal strength of communications between the home appliance and the wearable device; and starting operating if the signal strength is higher than or equal to a predetermined threshold strength, and/or stopping operating if the signal strength is lower than or equal to a predetermined stop threshold.

9. The method according to claim 5, further comprising:

receiving position information corresponding to a user's position; and starting or stopping operating according to the position information.

10. The method according to claim 9, wherein the position information indicates the user's position; and starting or stopping operating according to the position information comprises:

determining whether the user's position is within a predetermined range; and starting operating if the position is within the predetermined range, and/or stopping operating if the position is not within the predetermined range.

11. The method according to claim 9, wherein the position information comprises a determined result of determining whether the user's position is within a predetermined range; and starting or stopping operating according to the position information comprises:

starting operating if the determined result indicates that the position is within the predetermined range, and/or stopping operating if the determined result indicates that the position is not within the predetermined range.

12. A wearable device, comprising:

a processor; and a memory storing instructions executable by the processor;

wherein the processor is configured to:

receive operation mode information from a home appliance and position information corresponding to a user's position, wherein the operation mode information indicates a current operation mode of the home appliance and comprises various functional parameters needed for the home appliance to operate, and the position information indicates a relative distance between the user and another home appliance; and send the operation mode information to said another home appliance such that said another home appliance operates in the indicated operation mode when the relative distance between the user and said another home appliance is within a predetermined range, wherein said another home appliance and said home appliance have the same type of functionality.

13. The device according to claim 12, wherein the processor is also configured to:

update operation mode information stored in the wearable device with the operation mode information received from the home appliance.

14. The device according to claim 12, wherein the processor is also configured to:

detect a signal strength of communications between the home appliance and the wearable device; and if the detected signal strength is higher than or equal to a predetermined threshold strength, send a start indication to the home appliance, the start indication causing the home appliance to start operating.

15. The device according to claim 12, wherein the processor is also configured to:

detect a signal strength of communications between the home appliance and the wearable device; and send to the home appliance signal strength information indicating the detected signal strength, so that the home appliance starts operating if the signal strength indicated by the signal strength information is higher than or equal to a predetermined threshold strength.

16. A home appliance, comprising:

a processor; and a memory storing instructions executable by the processor;

wherein the processor is configured to:

receive operation mode information from a wearable device and position information corresponding to a user's position, wherein the operation mode information indicates an operation mode of another home appliance and comprises various functional parameters needed for said another home appliance to operate, and the position information indicates a relative distance between the user and the home appliance; and operate in the operation mode when the relative distance between the user and the home appliance is within a predetermined range, wherein said another home appliance and said home appliance have the same type of functionality.

17. The appliance according to claim 16, wherein the processor is also configured to:

receive a start indication, which is sent by the wearable device if a detected signal strength of communications between the home appliance and the wearable device is higher than or equal to a predetermined threshold strength; and start operating according to the start indication.

18. The appliance according to claim 16, wherein the processor is also configured to:

receive from the wearable device signal strength information indicating a signal strength of communications between the home appliance and the wearable device; and start operating if the signal strength indicated by the signal strength information is higher than or equal to a predetermined threshold strength.

19. The appliance according to claim 16, wherein the processor is also configured to:

detect a signal strength of communications between the home appliance and the wearable device; and start operating if the signal strength is higher than or equal to a predetermined threshold strength, and/or stop operating if the signal strength is lower than or equal to a predetermined stop threshold.

20. The appliance according to claim 16, wherein the processor is also configured to:

receive position information corresponding to a user's position; and start or stop operating according to the position information.

21. The appliance according to claim 20, wherein the position information indicates the user's position; and the processor is also configured to:

determine whether the user's position is within a predetermined range; and start operating if the position is within the predetermined range, and/or stop operating if the position is not within the predetermined range.

22. The appliance according to claim 20, wherein the position information comprises a determined result of determining whether the user's position is within a predetermined range; and the processor is also configured to:

start operating if the determined result indicates that the position is within the predetermined range, and/or stop operating if the determined result indicates that the position is not within the predetermined range.

* * * * *